(12) United States Patent
Tivelli

(10) Patent No.: US 10,865,916 B2
(45) Date of Patent: Dec. 15, 2020

(54) ANTI-UNSCREWING QUICK COUPLING FITTING

(71) Applicant: STUCCHI S.p.A., Brignano Gera d'Adda (IT)

(72) Inventor: Sergio Tivelli, Cividate al Piano (IT)

(73) Assignee: STUCCHI S.P.A., Brignano Gera d'Adda (IT)

( * ) Notice: Subject to any disclaimer, the term of this patent is extended or adjusted under 35 U.S.C. 154(b) by 460 days.

(21) Appl. No.: 15/580,955

(22) PCT Filed: Jun. 8, 2016

(86) PCT No.: PCT/IB2016/053361
§ 371 (c)(1),
(2) Date: Dec. 8, 2017

(87) PCT Pub. No.: WO2016/199035
PCT Pub. Date: Dec. 15, 2016

(65) Prior Publication Data
US 2018/0180201 A1    Jun. 28, 2018

(30) Foreign Application Priority Data
Jun. 10, 2015   (IT) ........................ 102015000022187

(51) Int. Cl.
*F16L 19/00* (2006.01)
*F16L 29/04* (2006.01)
*F16L 15/08* (2006.01)

(52) U.S. Cl.
CPC ............. *F16L 19/005* (2013.01); *F16L 29/04* (2013.01); *F16L 15/08* (2013.01)

(58) Field of Classification Search
CPC ......... F16L 19/005; F16L 29/04; F16L 15/08; F16L 19/02; F16L 19/0206;
(Continued)

(56) References Cited

U.S. PATENT DOCUMENTS 2,709,093 A * 5/1955 Zeeb ....................... F16L 29/04
                                                        285/82
3,971,614 A * 7/1976 Paoli ............................... 285/89
(Continued)

FOREIGN PATENT DOCUMENTS

EP      2 369 214      9/2011
FR      917 287        12/1946
(Continued)

OTHER PUBLICATIONS

International Search Report dated Sep. 28, 2016 in International Application No. PCT/IB2016/053361.
(Continued)

*Primary Examiner* — Matthew Troutman
*Assistant Examiner* — William S. Choi
(74) *Attorney, Agent, or Firm* — Wenderoth, Lind & Ponack, L.L.P.

(57) ABSTRACT

A quick coupling fitting (1) including a first connector (2) and a second connector (3) coaxially screwed along a longitudinal axis (L). The first connector (2) includes at least one guide track (27) which is integral with an external casing (23), a sliding ring (28) slidably mounted in axial alignment with the external casing (23) and adapted to slide on the at least one guide track (27), and a screwing ring (29) screwed with the external casing (23). The sliding ring (28) includes at least one tooth (288). The second connector (3) includes a locking ring (38) rotatably mounted and axially aligned with the external body (3) which includes at least one housing (388). The at least one tooth (288) is mountable with the at least one housing (388) in a fully screwed position of the quick coupling fitting (1).

9 Claims, 14 Drawing Sheets

(58) Field of Classification Search
CPC ............... F16L 27/0824; F16L 27/0832; F16L 27/1274; F16L 33/225; F16L 37/084; F16L 37/0887; F16L 37/1215; F16L 37/138; F16L 47/04; F16L 33/223
USPC ... 285/82, 89, 308, 353, 354, 386, 387, 392, 285/393
See application file for complete search history.

(56) References Cited

U.S. PATENT DOCUMENTS

| | | | | |
|---|---|---|---|---|
| 4,285,564 | A | * | 8/1981 | Spinner ................. 439/321 |
| 5,188,398 | A | | 2/1993 | Parimore, Jr. et al. |
| 2007/0102051 | A1 | * | 5/2007 | Zeiber ................. F16L 29/04 137/614.05 |
| 2013/0125377 | A1 | * | 5/2013 | Nick ................. F16L 19/005 285/85 |

FOREIGN PATENT DOCUMENTS

| | | |
|---|---|---|
| GB | 1 152 093 | 5/1969 |
| WO | 2007/042417 | 4/2007 |

OTHER PUBLICATIONS

Written Opinion of the International Searching Authority dated Sep. 28, 2016 in International Application No. PCT/IB/2016/053361.

\* cited by examiner

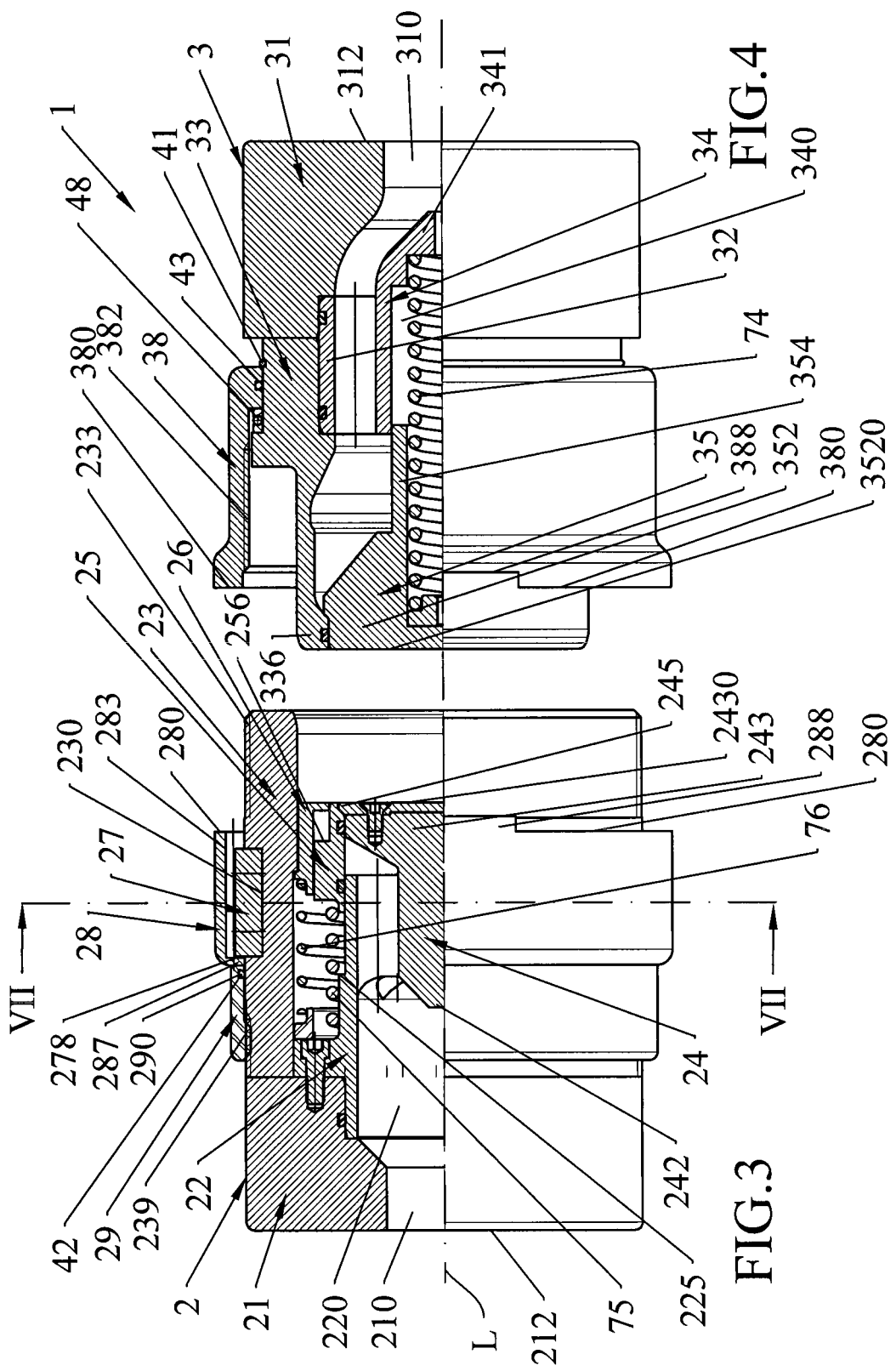

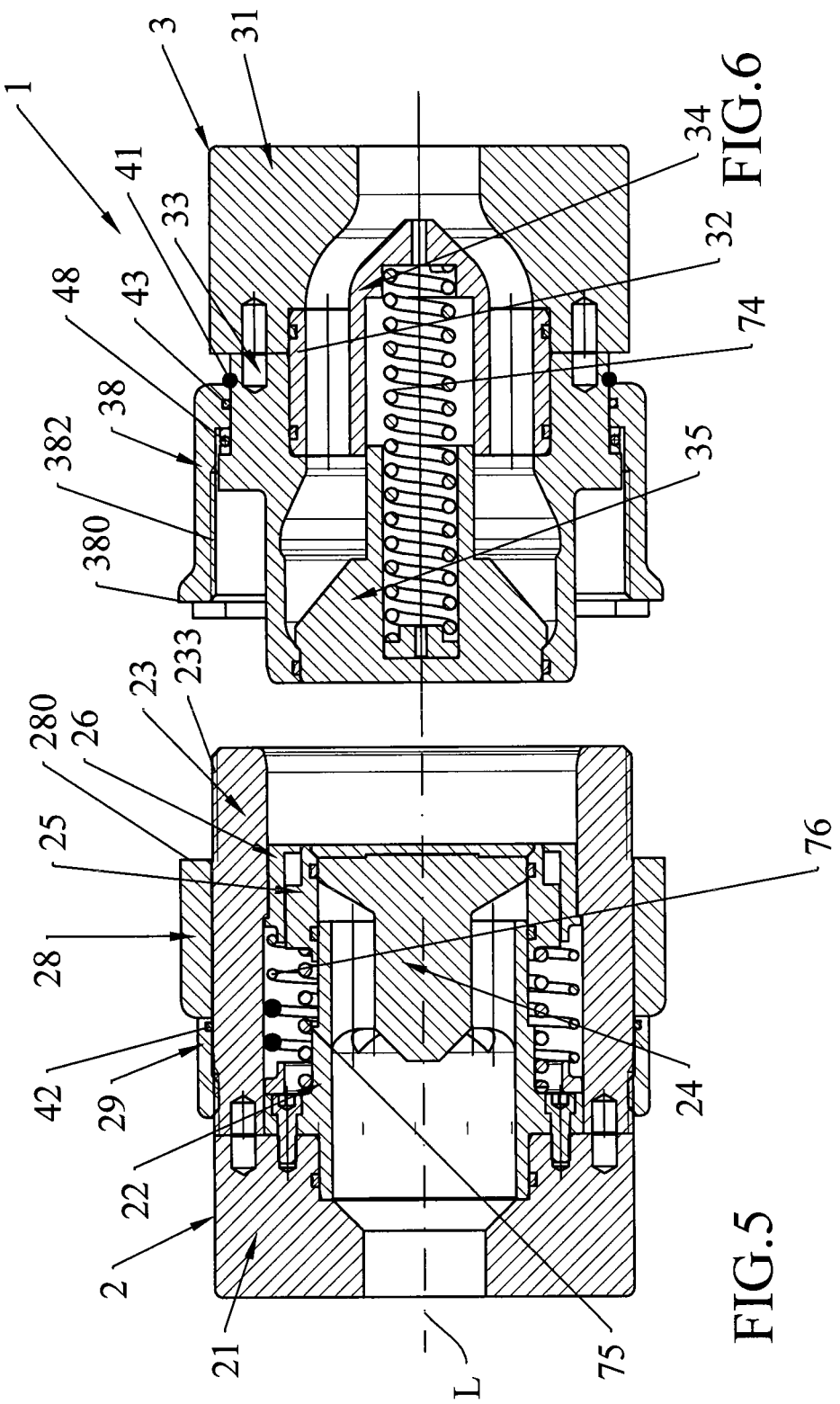

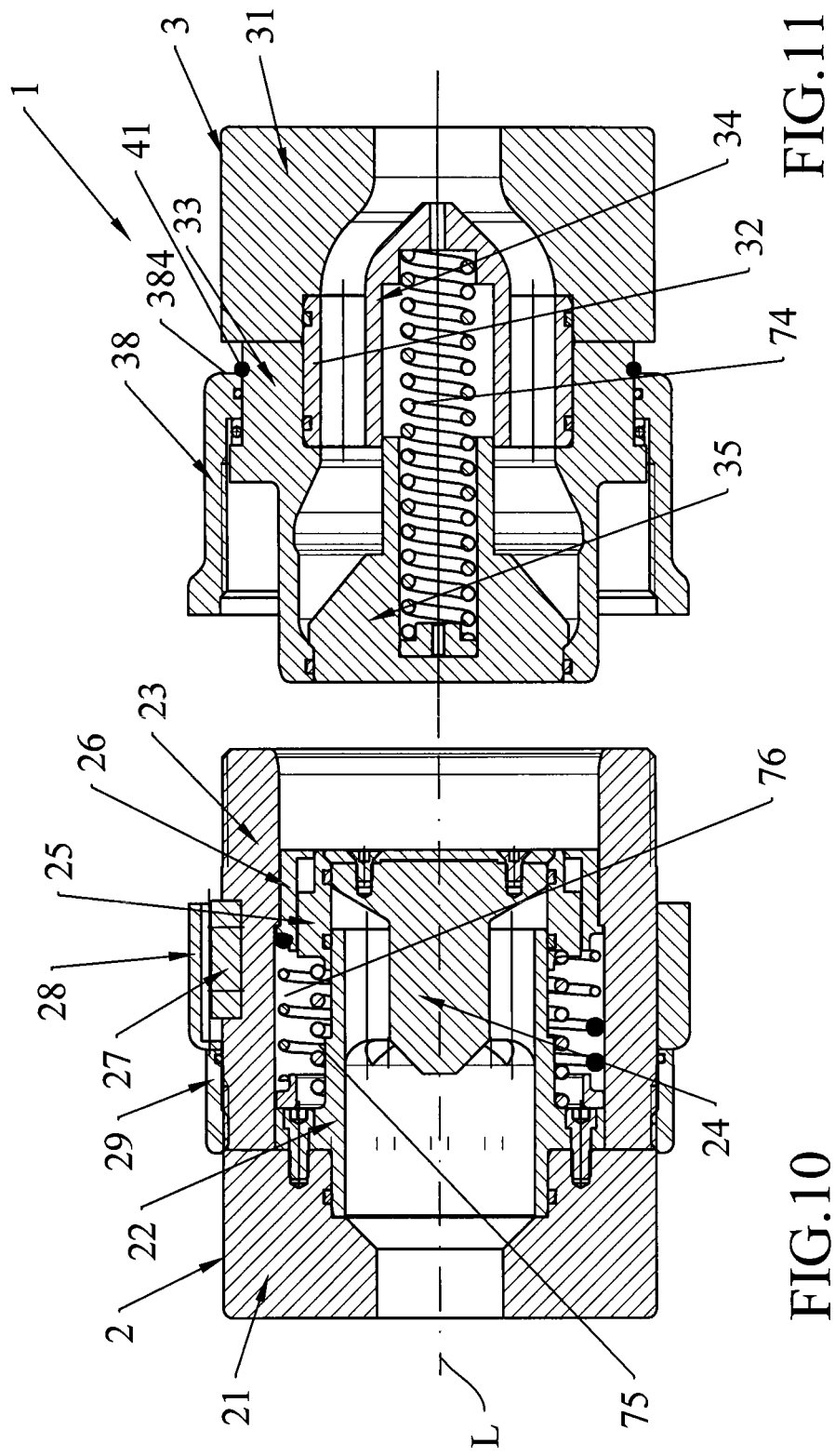

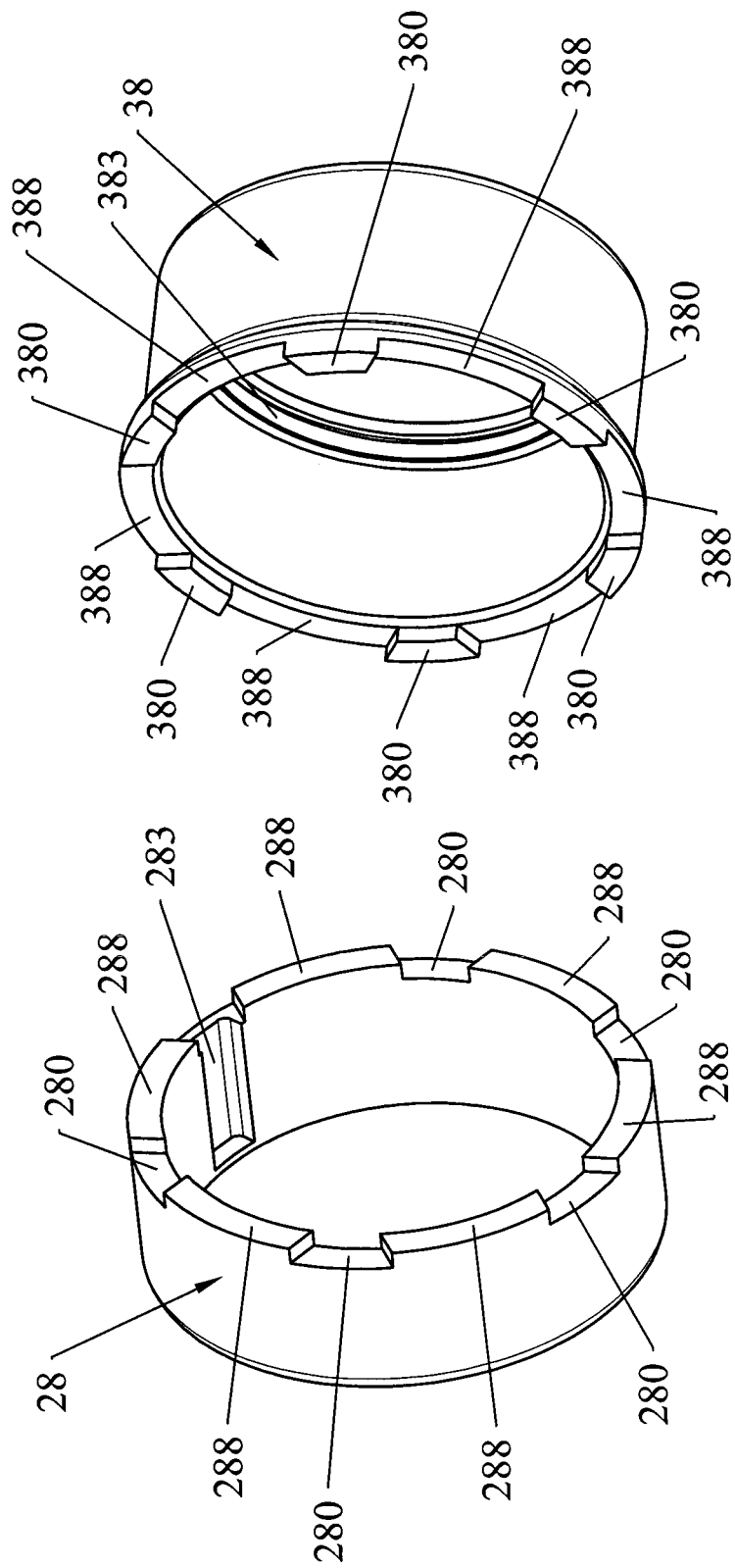

ANTI-UNSCREWING QUICK COUPLING FITTING

BACKGROUND OF THE INVENTION

1. Technical Field

The present invention relates to an unscrewing quick coupling fitting.

2. Description of the Related Art

Quick coupling fittings from the prior art include a female connector which can be slidably engaged coaxially with a male connector. Each connector includes a fitting engaged with a flexible hose. The flexible hose vibrates and twists during the operation of a hydraulic machine where quick couplings are used. The vibrations of the flexible hose coupled to the fitting of the connector are so strong that, after a given period of use, they cause the detachment of the female connector from the male connector of the quick coupling fitting, thus causing a disadvantageous reduction in the hydraulic liquid flow.

Quick couplings exist which avoid the disconnection of the quick coupling fitting due to vibrations of the flexible hoses and implement either a plurality of balls mounted in a plurality of housings obtained in an external casing of the female connector or there are those who use a plurality of gaskets in place of the balls, such as in EP-2369214-A1, which describes a quick coupling fitting which comprises a female connector comprising an external casing which comprises a plurality of housings adapted to house a plurality of stopping gaskets comprising a plurality of toroidal sectors.

Disadvantageously, when the vibrations become too strong and twistings of the flexible hoses also come into play, the quick coupling fittings of the prior art are disconnected. The twistings of the flexible hoses connected to the connectors of the quick couplings are the most responsible for the uncoupling of the quick coupling fittings. A single twist with an increased angle is sufficient to disconnect the quick coupling fitting, even after short use of the machine. Particularly high twisting forces of the flexible hoses or forces with particularly large angles break the connection of the quick coupling fittings.

Other quick couplings include return springs for keeping stopping elements under pressure in order to lock the fitting between the male and female connectors. If the return springs have large dimensions, they are disadvantageous when used on large quick coupling fittings, since the spring cannot be moved manually to lock the movement of the stopping elements.

SUMMARY OF THE INVENTION

It is the object of the present invention to provide an unscrewing quick coupling fitting which is safe, resistant to uncoupling caused both by increased twistings and vibrations of flexible hoses connected to fittings of respective connectors of the quick coupling fitting, resists pulsation and jerking forces, resists very strong flows of liquid without being disengaged, does not break, is maneuverable and easy to be locked by hand.

BRIEF DESCRIPTION OF THE DRAWINGS

These and other features of the present invention will become more apparent from the following detailed description of a practical embodiment thereof, shown by way of non-limiting example in the accompanying drawings, in which:

FIG. 3 shows a sectional view of the female connector according to line in FIG. 1, in an uncoupled position;

FIG. 4 shows a sectional view of the male connector according to line VI-VI in FIG. 2, in an uncoupled position of the quick coupling fitting;

FIG. 5 shows a sectional view of the female connector according to line V-V in FIG. 1, in the uncoupled position of the quick coupling fitting;

FIG. 6 shows a sectional view of the male connector according to line VI-VI in FIG. 2, in the uncoupled position of the quick coupling fitting;

FIGS. 10 and 11 show the female connector in FIG. 3 axially aligned with the male connector in FIG. 4, where the female connector comprises a sliding ring in disengagement position;

FIG. 19 shows a perspective view of the sliding ring of the female connector of the quick coupling fitting;

FIG. 20 shows a perspective view of the locking ring of the male connector of the quick coupling fitting.

DETAILED DESCRIPTION OF THE INVENTION

Figure 1:
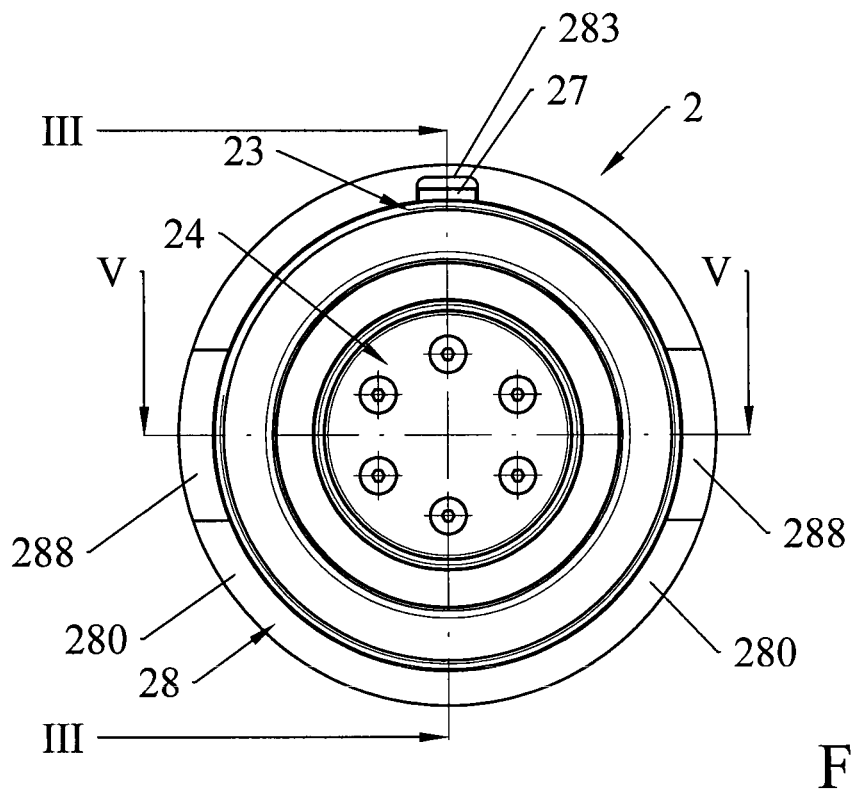
FIG. 1 shows a view along a coupling axis, of a female connector of a quick coupling fitting.
Figure 2:
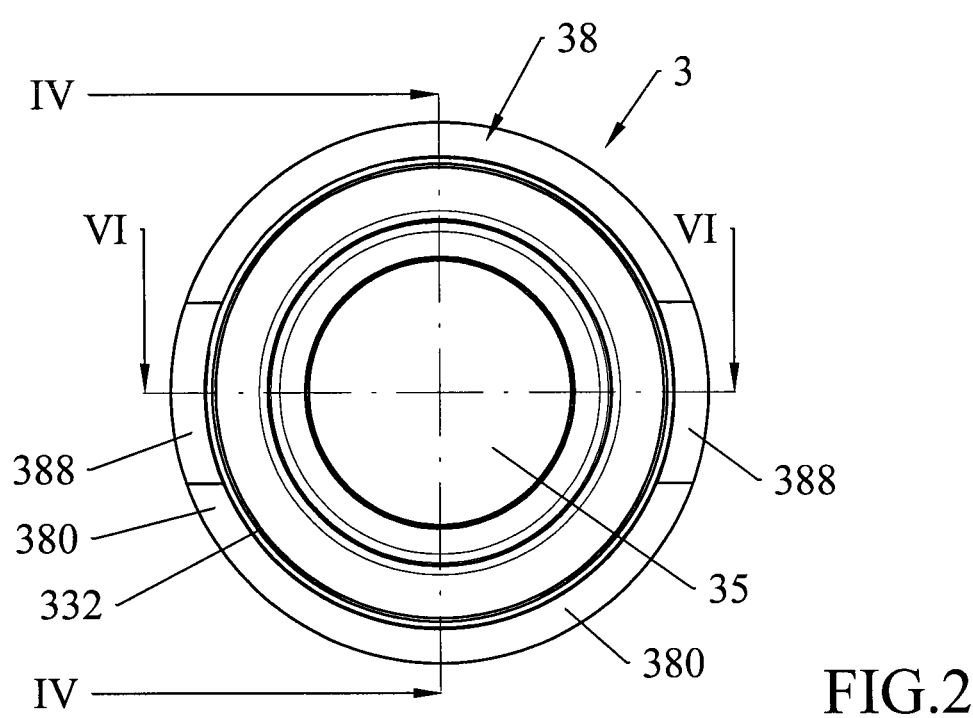
FIG. 2 shows a view along the coupling axis, of a male connector of the quick coupling fitting.
Figure 7:
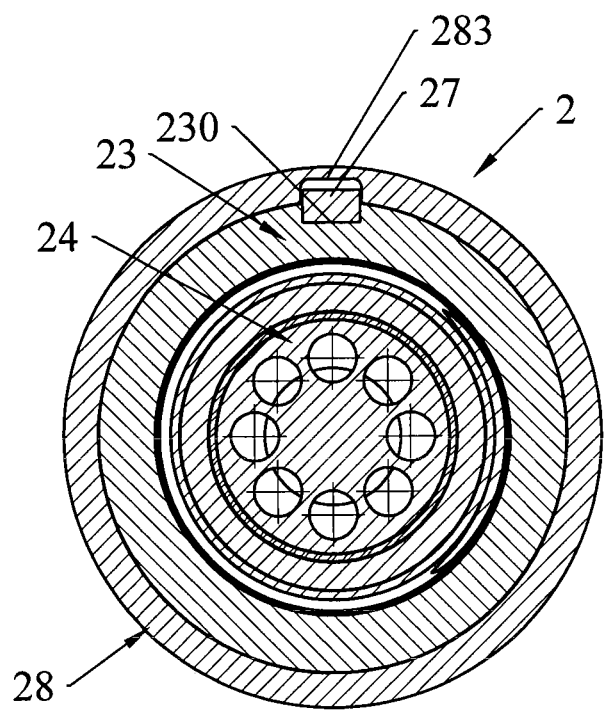
FIG. 7 shows a sectional view of the female connector according to line VII-VII in FIG. 3.

With reference to the figures listed above, and in particular to FIGS. 3 and 4, a quick coupling fitting 1 is noted comprising a female connector 2 and a male connector 3, which are mutually switched from a disengagement position (FIGS. 3-6) to an engagement position (FIGS. 12-18).

The female connector 2 is of the flat face type. It is also possible to use other female connectors 2, such as for example of the mushroom-shaped type or of other types present in the prior art.

The female connector 2 and the male connector 3 coaxially penetrate each other along a longitudinal axis L and screw to each other to keep the quick coupling fitting 1 stable and long-lasting. The female connector 2 comprises a first thread 233 and the male connector 3 comprises a complementary second thread 382 which is screwed with the first thread 233. The male connector 3 coaxially penetrates the female connector 2 along the longitudinal axis L and frontally, thus allowing the liquid to pass in the quick coupling fitting 1 from a hose to another hose when the quick coupling fitting 1 is in a fully screwed position.

The female connector 2 comprises a hollow cylindrical-shaped main body 21 which is connected at one end 212 to a flexible hose (not shown in the drawings). The main body 21 mounts a hollow cylindrical-shaped internal casing 22 for sealing the female connector 2 and a hollow cylindrical external casing 23 of the female connector 2.

The external casing 23 comprises the first thread 233 of the female connector 2. The first thread 233 is provided on an external surface of the external casing 23 and is arranged on a portion of the external surface of the external casing 23 which is in the direction of the male connector 3 so as to be screwed with the male connector 3.

The internal sealing casing 22 comprises a cavity 220 which is connected to a cavity 210 of the main body 21 of the female connector 2. The internal sealing casing 22 comprises a female rod 24 radially fixed integrally with the internal sealing casing 22. The internal sealing casing 22 is in one piece with the female rod 24. The female rod 24 of the female connector 2 comprises a portion 242 facing in contrast with a flow of liquid originating from cavity 220, and a mushroom-shaped portion 243 with flat face 2430 facing the male connector 3. Locking radial ends 245 of the mushroom-shaped portion 243 of the female rod 24 are adapted to serve as a first stop 245 for a cleaning casing 25.

The cleaning casing 25 of the female connector 2 is mounted slidably aligned along axis L external to the internal sealing casing 22. The cleaning casing 25 is adapted to slide from the first stop 245 to a second stop 225 of the internal sealing casing 22.

The internal sealing casing 22 comprises an external radial wall 223 which mounts a first compression spring 75 and a second compression spring 76. The internal sealing casing 22 slidably mounts the cleaning casing 25 axially aligned, along the longitudinal axis L, the cleaning casing 25 being in contrast with the first compression spring 75 which opposes the sliding motion of the cleaning casing 25 along the longitudinal axis L on the internal sealing casing 22.

The cleaning casing 25 slidably mounts a slide 26 axially aligned, which is in contrast with the second compression spring 76. The slide 26 slides axially aligned along the longitudinal axis L, even on an internal surface of the external casing 23.

The second compression spring 76 is adapted to be switched from a resting position, which keeps the slide 26 in position, to a compression position in which the slide 26 slides along the longitudinal axis L on the cleaning casing 25 up to a stop 256 of the cleaning casing 25.

The external casing 23 of the female connector 2 comprises an axial groove 230 which mounts a guide track 27. The guide track 27 has a parallelepiped shape arranged along the longitudinal axis L. The guide track 27 is integrally mounted with the external casing 23. The guide track 27 is mounted externally to the external casing 23.

A sliding ring 28 of the female connector 2 is slidably mounted axially aligned along the longitudinal axis L outside the external casing 23, and may slide on the guide track 27 up to one end of the guide track 27 abutting with a stop 287 which is a radial wall 287 of the sliding ring 28. As shown in particular in FIG. 14, the sliding ring 28 comprises a groove 283 facing inwardly, which is adapted to act as a guide 283 for the guide track 27.

A screwing ring 29 of the female connector 2 is screwed to an external thread 239 of the external casing 23. The screwing ring 29 screws onto the external thread 239 of the external casing 23. The external thread 239 is positioned on an external surface of the external casing 23.

The sliding ring 28 slides axially on the guide track 27 up to one end 278 of the guide track 27 abutting with the radial wall 287 of the sliding ring 28. The end 278 of the guide track 27 acts as a stop for the sliding ring 28.

The screwing ring 29 of the female connector 2 screws along the longitudinal axis L up to a position in contrast with the radial wall 287 of the sliding ring 28, so as to fix a locking position of the sliding ring 28 in contact with end 278 of the guide track 27 on one side, and in contact with the sliding ring 28 on the other side. The screwing ring 29 advantageously allows the sliding ring 28 to be locked in the locking position.

The screwing ring 29 comprises a housing 290 obtained between an internal surface of the screwing ring 29 and an external surface of the external casing 23 of the female connector 2. The housing 290 of the screwing ring 29 is arranged at one end of the screwing ring 29 facing towards the male connector 3 and is therefore positioned close to the radial wall 287 of the sliding ring 28. The housing 290 mounts an anti-vibration gasket 42 of the "O-ring" type, which advantageously prevents the screwing ring 29 from being loosened due to the vibrations caused by the twisting of the hoses and by the flowing of liquid during the operation of the quick coupling fittings 1.

The male connector 3 of the quick coupling fitting 1 comprises a hollow cylindrical-shaped main body 31 which is connected at one end 312 to a flexible hose (not shown in the drawings).

The main body 31 mounts a hollow cylindrical-shaped external body 33 of the male connector 3. The external body 33 comprises an extension 336 adapted to penetrate the female connector 2 and to come into contact abutting in contrast with slide 26 up to pushing it into compression in contrast with the cleaning casing 25, and to compress an assembly consisting of the cleaning casing 25 and slide 26, while the first compression spring 75 and the second compression spring 76 oppose the motion. The extension 336 is arranged along the longitudinal axis L.

The male connector 3 mounts an internal casing 32 of the male connector 3.

The internal casing 32 comprises a male rod 34 radially fixed integrally with the main body 31 and with the external body 33 of the male connector 3. The male rod 34 is in one piece with the internal casing 32.

The male rod 34 of the male connector 3 comprises a cup-shaped portion 341 with a convex external surface in contact with the liquid in a cavity 310 of the main body 31, and an internal portion 340 which is hollow and which mounts a third return spring 74 which is adapted to be switched from a resting position to a compression position.

The third return spring 74 mounts a piston 35 comprising a rod 354 which is adapted to penetrate the internal portion 340 of the male rod 34. The rod 354 is in contrast with the third return spring 74.

The piston 35 also comprises a head 352 comprising a flat face 3520 adapted to contrast with the flat face 2430 of the female rod 24 of the female connector 2.

The head 352 is slidably mounted with the extension 336 of the external body 33 of the male connector 3.

When the flat face 3520 of head 352 of the male connector 3 comes into contact with the flat face 2430 of the female rod 24 of the female connector 2, the third return spring 74 compresses, thus causing head 352 to slide on extension 336 of the external body 33 and rod 354 of piston 35 to penetrate the male rod 34.

The external body 33 axially mounts a locking ring 38 rotatably associated with bearings 48. The bearings 48 are mounted integrally with the external body 33. The locking ring 38 is rotatably mounted with the external body 33. The locking ring 38 comprises an annular housing 383 obtained internally and adapted to mount a dust seal gasket 43. The locking ring 38 rotates on the bearings 48.

The external body 33 also mounts a retaining ring 41 at stroke end, which advantageously allows the locking ring 38 to be kept slidably in place on the bearings 48. The retaining ring 41 is positioned between an end stroke wall 384 of the locking ring 38 (FIG. 11), where the end stroke wall 384 is arranged in the direction of the main body 31 and of the flexible hose mounted with the male connector 3.

Figure 12:
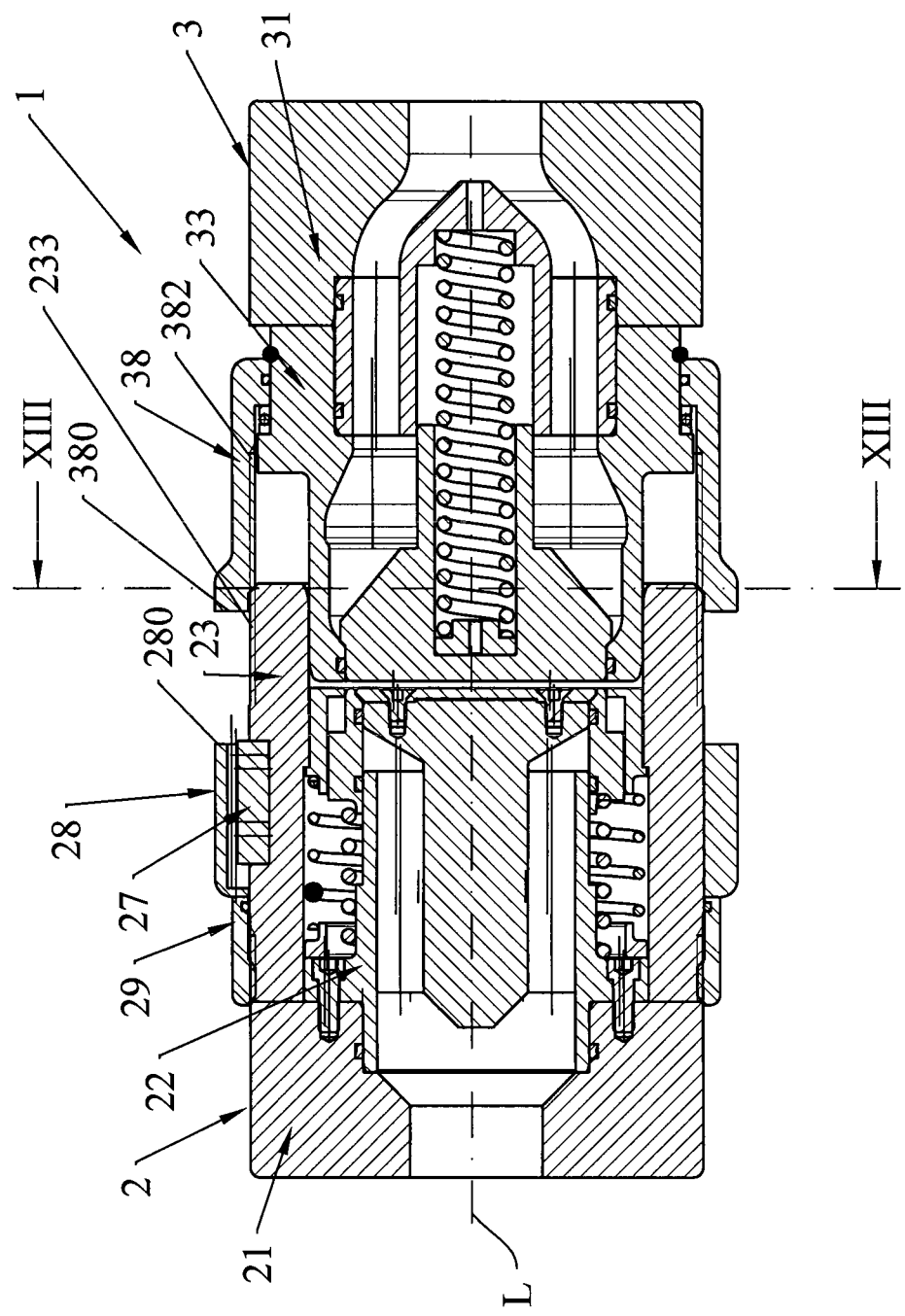
FIG. 12 shows the quick coupling fitting in a first engagement position between the female connector and the male connector, corresponding to a start screwing position.
Figure 16:
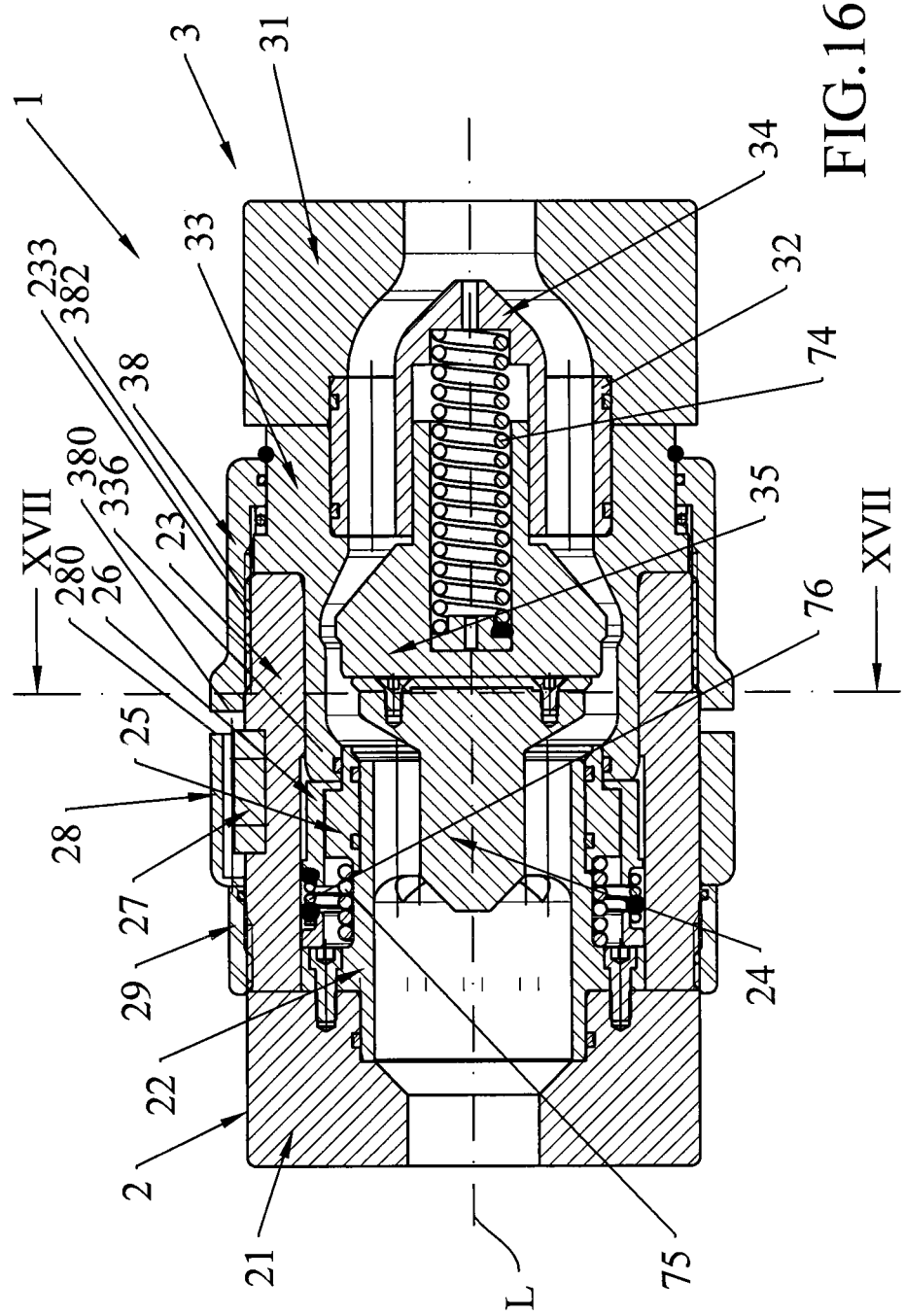
FIG. 16 shows the quick coupling fitting in a fully engaged position between the female connector and the male connector, corresponding to a fully screwed position.

The locking ring 38 comprises the second thread 382 of the male connector 3. The thread 382 is provided on an internal surface of the locking ring 38, where the internal surface is facing towards an external surface of the external body 33 of the male connector. Since the second thread 382 of the locking ring 38 is complementary to the first thread 233 of the female connector 2, the locking ring 38 may be screwed with the first thread 233 of the female connector 2 to cause the quick coupling fitting 1 to switch from a first engagement position between the female connector 2 and the male connector 3, corresponding to a start screwing position as shown in FIG. 12, up to a fully engaged position between the female connector 2 and the male connector 3 corresponding to a fully screwed position of the quick coupling fitting 1, as shown in FIG. 16. During the screwing, the quick coupling fitting 1 switches from a plurality of screwing positions, an example of which is seen in a half screwing position shown in FIGS. 14-15.

The locking ring 38 rotates about the longitudinal axis L sliding on the bearings 48 of the external body 33 of the male connector 3.

The locking ring 38 is kept in place on the bearings 48 due to the retaining ring 41.

By rotating about the longitudinal axis L, the locking ring 38 of the male connector 3 screws onto the female connector 2.

As shown in particular in FIGS. 3-4, 13, 15, 17-20, the sliding ring 28 and the locking ring 38 comprise a plurality of teeth 288, respectively, which are adapted to interlock with respective complementary housings 388.

The sliding ring 28 of the female connector 2 comprises an annular end 280 facing towards the male connector 3. A plurality of teeth 288 extend from the annular end 280 of the sliding ring 28 in axial direction along the longitudinal axis L. The teeth 288 of the sliding ring 28 are arranged along the longitudinal axis L.

The locking ring 38 comprises an annular end 380 facing towards the female connector 2. A plurality of housings 388 for the teeth 288 are obtained on the annular end 380 of the locking ring 38, in axial direction along the longitudinal axis L. The housings 388 of the locking ring 28 are arranged along the longitudinal axis L. The dimensions and shape of the housings 388 are complementary to those of the teeth 288 so that the teeth 288 may abut in contrast with the housings 388. Tooth 288 is not expected to fully match with the shape of housing 388, so as to allow a clearance between the walls of tooth 288 and the walls of housing 388, the clearance being advantageous to allow the first thread 233 to be fully screwed onto the second thread 382.

Each tooth 288 of the sliding ring 28 can be mounted in a tooth housing 388 of the locking ring 38. The frame is a snap frame between tooth 288 of the sliding ring 28 and the housing for the tooth 388 of the locking ring 38.

Figure 13:
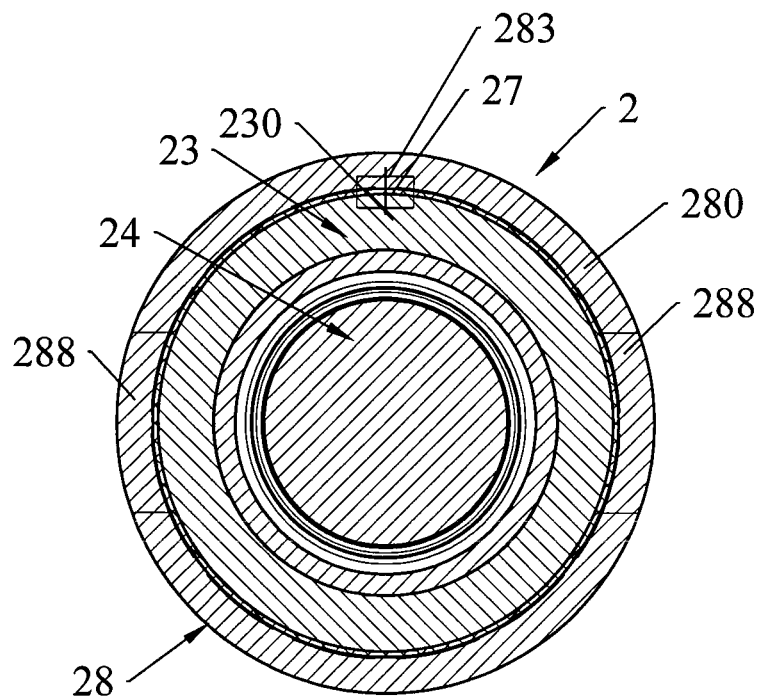
FIG. 13 shows a sectional view of the quick coupling fitting according to line XIII-XIII in FIG. 12.
Figure 14:
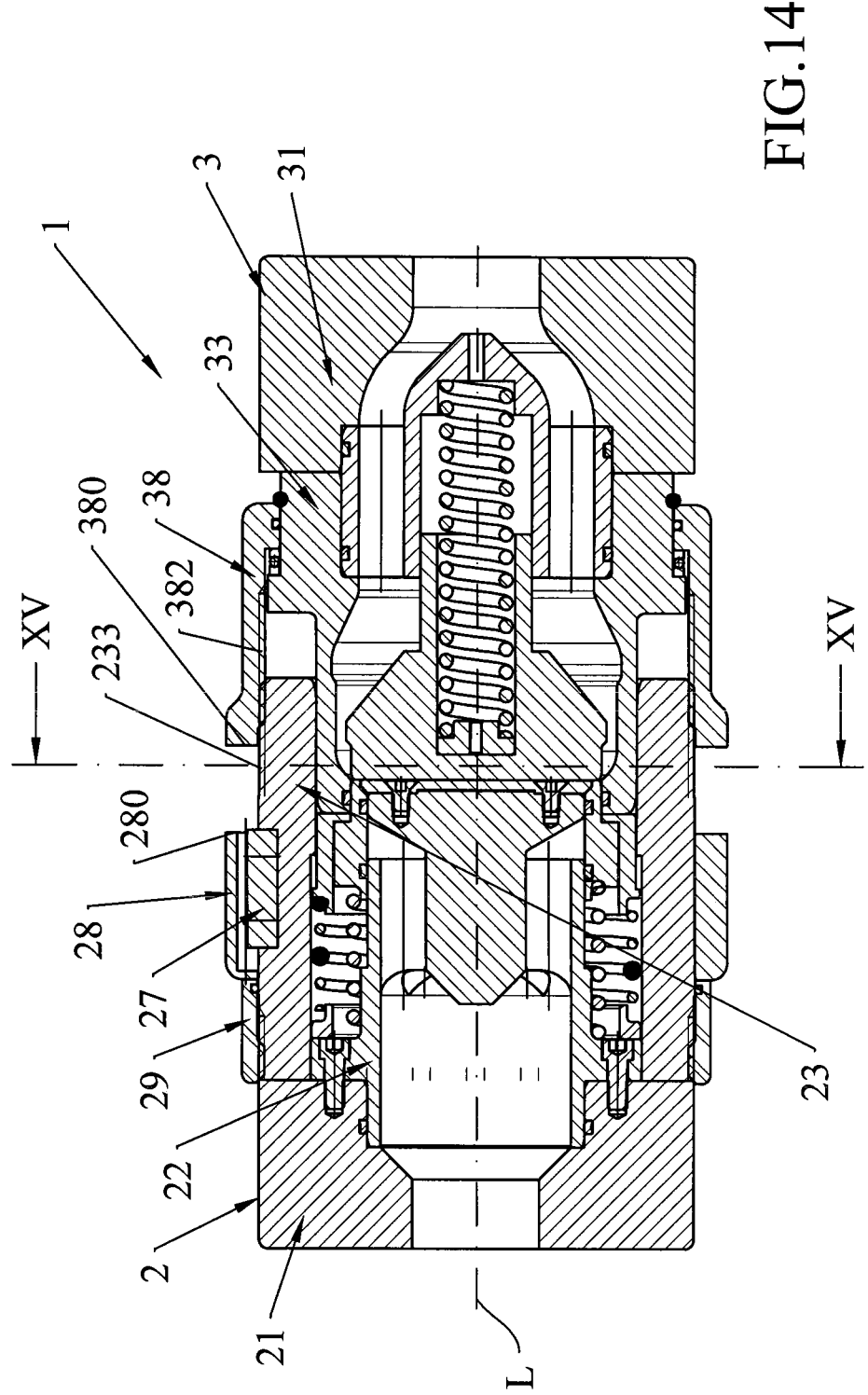
FIG. 14 shows the quick coupling fitting in a second engagement position between the female connector and the male connector, corresponding to a half screwing position.
Figure 15:
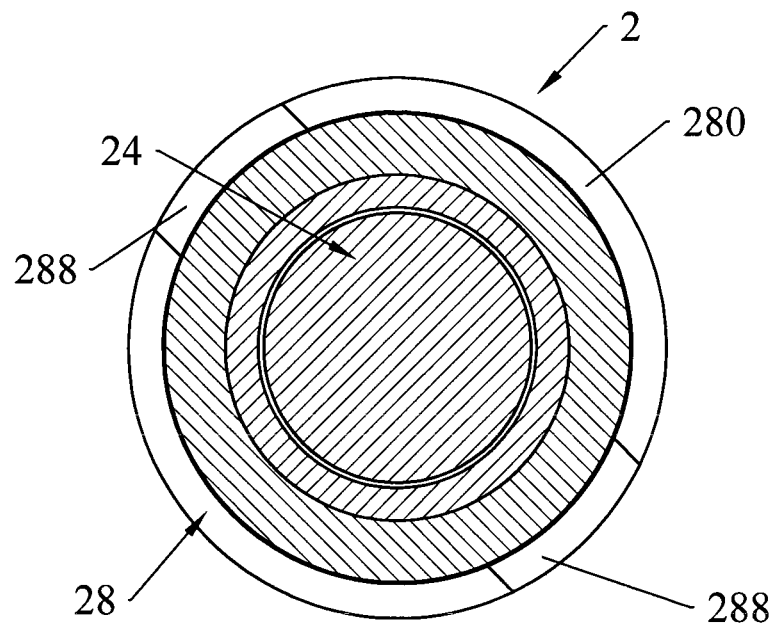
FIG. 15 shows a sectional view of the quick coupling fitting according to line XV-XV in FIG. 14.
Figure 17:
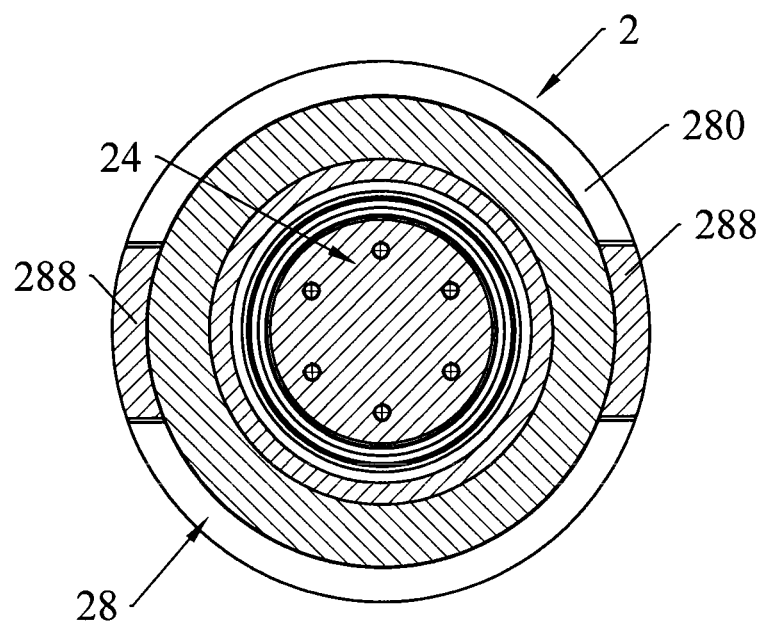
FIG. 17 shows a sectional view of the quick coupling fitting according to line XVII-XVII in FIG. 16.

The first thread 233 of the female connector 2 is in phase with the complementary second thread 382 of the male connector 3 so that when the female connector 2 is screwed with the male connector 3, the teeth 288 are aligned and are at the housings 388 when the female connector 2 is completely screwed with the male connector 3 of the quick coupling fitting 1. The first thread 233 has a pitch which is in phase with a pitch of the second thread 382 so that the teeth 288 and the housings 388 are aligned in the fully screwed position of the quick coupling fitting 1, as shown in FIG. 16. As shown in FIGS. 12-13, thread 233 can be engaged by the complementary thread 382 in a point such that a number of screwing revolutions is maintained between the male connector 3 and the female connector 2, which allows teeth 288 and housings 388 to be aligned with one another when screwing is complete, and so that the surfaces of the annular end 380 and of the housings 388 of the locking ring 38 abut in contrast with the surfaces of the annular end 280 and of the teeth 288 of the sliding ring 28, as shown in FIGS. 16-17.

With regard to the operation of the quick coupling fitting 1, the female connector 2 and the male connector 3 are uncoupled from each other, starting from FIGS. 3-6. The screwing ring 29 is fully screwed up to lock the sliding ring 28 in contact with the guide track 27.

Figures 8, 9:
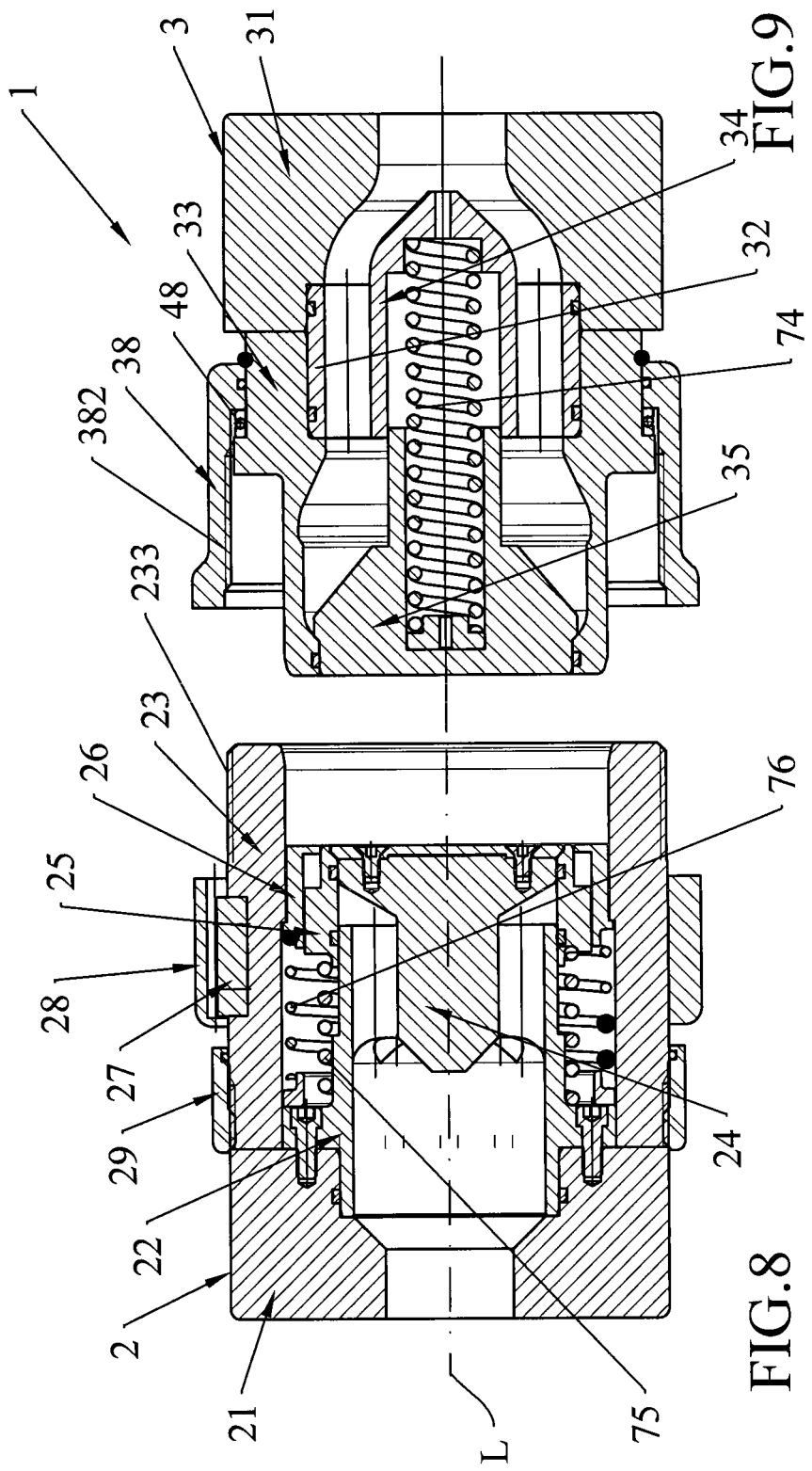
FIGS. 8 and 9 show the female connector in FIG. 3 axially aligned with the male connector in FIG. 4, where the female connector comprises a screwing ring in fully loosened position.

As shown in FIGS. 8-9, the screwing ring 29 is fully loosened up to free the sliding ring 28.

After loosening the screwing ring 29 (as shown in FIGS. 10-11), the sliding ring 28 may slide freely between end 278 of the guide track 27 and the screwing ring 29.

As shown in FIG. 12, the female connector 2 is fully screwed with the male connector 3 by means of respective threads 233 and 382 which are advantageously in phase so as to allow the alignment between the teeth 288 and the housings 388, the quick coupling fitting 1 being in the first engagement position which corresponds to the first screwing position, as shown in FIG. 12.

During a screwing step between the female connector 2 and the male connector 3, extension 336 of the external body 33 penetrates the female connector 2 and comes into compression contact with slide 26 and compresses it into contact with the cleaning casing 25. Proceeding with the screwing step, extension 336 continues to compress slide 26 and the cleaning casing 25.

The flat face 3520 of head 352 of the male connector 3 comes into contact with the flat face 2430 of the female rod 24 of the female connector 2 and the third return spring 74 compresses, thus causing head 352 to slide on extension 336 of the external body 33 and rod 354 of piston 35 to penetrate the male rod 34. Thereby, the liquid may flow through the quick coupling fitting 1.

Once the screwing step is finished between the first thread 233 of the female connector and the second thread 382 of the locking ring 38 of the male connector 3, the quick coupling fitting 1 is in the fully screwed position (as shown in FIG. 16) and allows the liquid to pass in the quick coupling fitting 1 from one hose to another hose.

Figure 18:
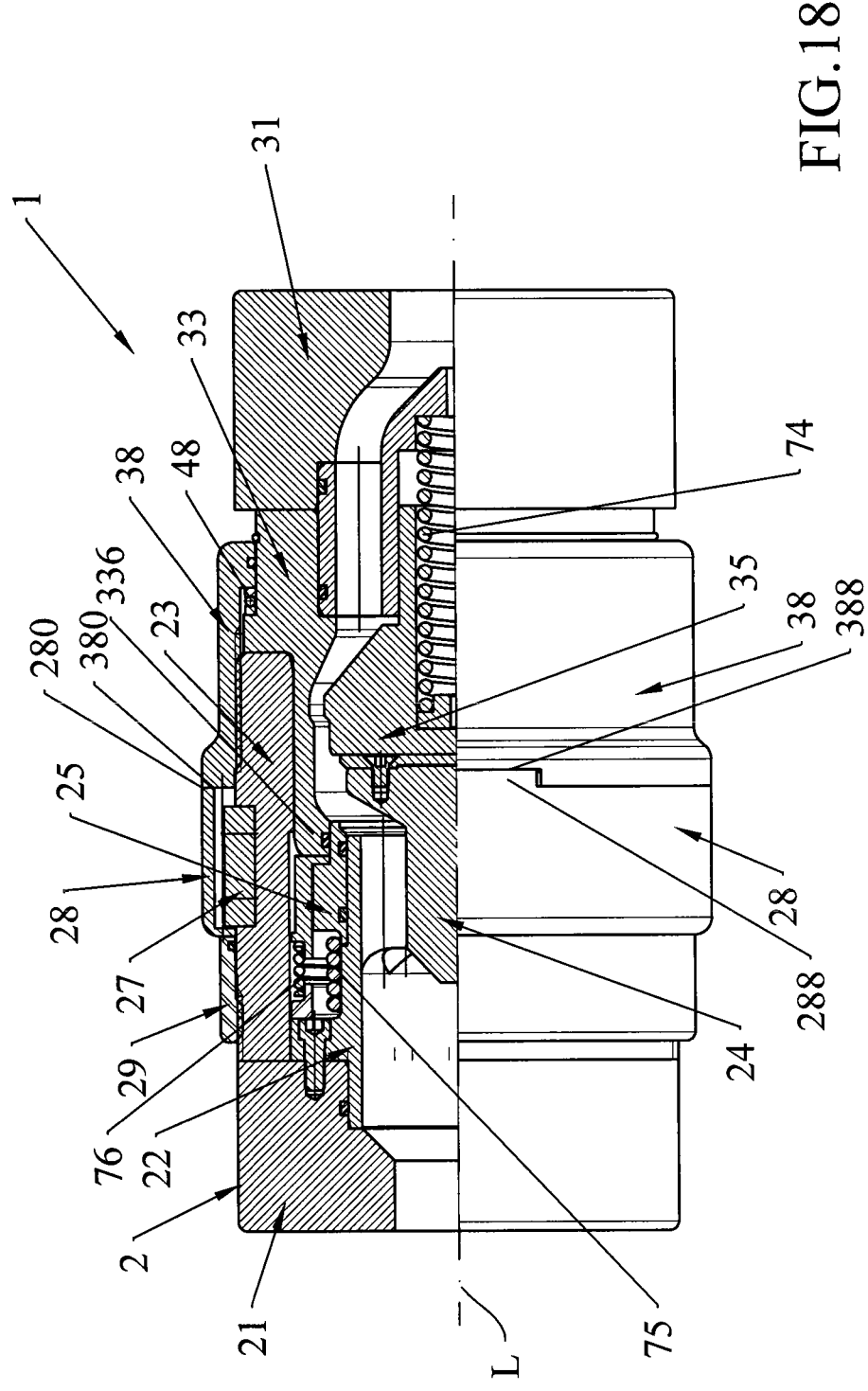
FIG. 18 shows the quick coupling fitting in an engagement position with the sliding ring of the female connector in an engagement position with a locking ring of the male connector and with the screwing ring in a fully screwed position in locking position for locking the sliding ring in an engagement position with the locking ring.

An unscrewing locking step is provided which, as shown in FIG. 18, comprises screwing the screwing ring 29 in contact with the sliding ring 28, thus causing it to slide on the guide track 27 until the surfaces of the annular end 380 and of the housings 388 of the locking ring 38 abut in contact with the surfaces of the annular end 280 and of the teeth 288 of the sliding ring 28. The teeth 288 abut with the housings 388 in the fully screwed position of the quick coupling fitting 1.

The screwing ring 29 screws in contact with the sliding ring 28, the screwing ring 29 pushes the sliding ring 28 which slides on the guide track 27 and the sliding ring 28 pushes the teeth 288 of the sliding ring 28 into the housings 388 of the locking ring 38.

Once in fully screwed position, the end 278 of the guide track 27 is not expected to abut with the wall 287 of the sliding ring 28.

The teeth 288 of the sliding ring 28, which are aligned with the respective housings 388 of the locking ring 38 of the male connector 3, are introduced into their own respective housing 388 as the screwing ring 29 is screwed, thus advantageously locking the female connector 2 and the male connector 3 in locked position, thus allowing the quick coupling fitting 1 to be of the unscrewing type, safe, resistant to loosening or to uncoupling caused both by twisting and by increased vibrations of the flexible hoses connected to the fittings of the respective connectors 2, 3 of the quick coupling fitting 1.

The quick coupling connector 1 according to the present invention advantageously allows pulsation and jerking forces to be resisted, as well as very strong flows of liquid, without being disengaged or loosened and without breaking.

The female connector 2 may be referred to as first connector 2 while the male connector 3 may be referred to as second connector.

Alternatively, the external casing 23 of the female connector 2 comprises the guide track 27, which is in one piece on the external surface thereof. The guide track 27 is arranged axially aligned along the longitudinal axis L to cause the sliding ring 28 to axially slide. Another alternative includes an equivalent configuration which has the locking ring 38 rotatably mounted by means of bearings 48 with the external casing 23 of the female connector 2, while the sliding ring 28 is mounted slidably axially aligned with the external body 33 of the male connector 3. Therefore, the male connector 3 would comprise the guide track 27 and the screwing ring 29 which screws onto thread 239, which in this alternative is provided on the external body 33 of the male connector 3. In the alternative, the first thread 233 would be provided on the external body 33 of the male connector 3, and the second thread 382 would remain on the locking ring 38 of the female connector 2. In another alternative, the female connector 2 and the male connector 3 exchange places, i.e. the male connector 3 becomes the first connector 2 while the female connector 2 becomes the second connector 3. That is, the first connector 2, which in the another alternative is the male connector 3, mounts the screwing ring 29, the guide track 27 and the sliding ring 28, while the second connector 3, which in the another alternative is the female connector 2, mounts the locking ring 38.

A further alternative includes a single tooth 288 and a single housing 388.

A still further alternative includes a single tooth 288 and the housings 388 which are a plurality of housings 388.

Alternatively again, the external casing 23 comprises a plurality of guide tracks 27 which are integral with the external casing 23 and are arranged along the longitudinal axis L.

A still further alternative does not include a retaining ring 41, but provides for the main body 31 to be more elongated in the direction of the female connector 2 so as to provide a step between a diameter of the main body 31 and a diameter of the external body 33, the step being adapted to keep the locking ring 38 in place on the bearings 48 of the external body 33 of the male connector 3. The male connector 3 comprises the main body 31 elongated in the direction of the first connector 2. The main body 31 has a diameter greater than the diameter of the external body 33, thus creating the step which is adapted to keep the locking ring 38 in place with the bearings 48 of the male connector 3.

The invention claimed is:

1. A quick coupling fitting comprising:
   a first connector comprising a first thread; and
   a second connector comprising a second thread that is screwed with the first thread of said first connector, said second connector penetrating said first connector co-axially along a longitudinal axis (L) and frontally allowing a fluid to pass through the quick coupling fitting when said quick coupling fitting is in a fully screwed position,
   wherein said first connector includes an external casing, a sliding ring slidably axially mounted onto the external casing, and a screwing ring,
   wherein said second connector includes an external body, a locking ring axially mounted onto the external body and rotatably onto the external body about the longitudinal axis (L),
   wherein the sliding ring includes at least one tooth that extends from an annular end of the sliding ring facing towards said second connector,
   wherein the locking ring includes at least one housing that extends from an annular end of the locking ring facing towards said first connector,
   wherein the at least one tooth is able to engage the at least one housing providing a fully screwed position of the quick coupling fitting allowing a fluid to pass through the quick coupling fitting,
   wherein said first connector further comprises at least one guide track integral with the external casing and disposed along the longitudinal axis (L), such that the sliding ring is able to slide along the at least one guide track, which is able to prevent any rotation of the sliding ring about the longitudinal axis (L),
   wherein the screwing ring is screwed onto said external casing, and
   wherein, when the quick coupling fitting is in the fully screwed position, the sliding ring is suitable for passing from a sliding configuration to a locking configuration in which the screwing ring blocks the sliding of the sliding ring, thus providing an unscrewing locking of the quick coupling fitting in the fully screwed position.

2. The quick coupling fitting according to claim 1, wherein the first thread of said first connector is screwed in phase with the second thread of said second connector so that the at least one tooth is aligned with the at least one housing in the fully screwed position of the quick coupling fitting.

3. The quick coupling fitting according to claim 1, wherein the first thread of said first connector comprises a pitch in phase with a pitch of the second thread of said second connector so that, in the fully screwed position of the quick coupling fitting, the at least one tooth is aligned with the at least one housing.

4. The quick coupling fitting according to claim 1, wherein the locking ring comprises the second thread of said second connector, and rotation of the locking ring about the longitudinal axis (L) screws said first connector with said second connector, allowing the quick coupling fitting to pass from a first engagement position of said first connector with said second connector corresponding to a start screwing position, until a fully engaged position of said first connector with said second connector corresponding to a fully screwed position of the quick coupling fitting.

5. The quick coupling fitting according to claim 1, wherein the locking ring rotates about the longitudinal axis (L) sliding on bearings which are mounted with the external body of said second connector.

6. The quick coupling fitting according to claim 5, wherein the external body mounts a retaining ring for maintaining the locking ring slidably in place with the bearings.

7. The quick coupling fitting according to claim 5, wherein said second connector comprises a main body that extends towards said first connector, the main body has a diameter greater than a diameter of the external body creating a step which is adapted for maintaining the locking ring in place with the bearings of said second connector.

8. The quick coupling fitting according to claim 1, wherein the external casing of said first connector comprises at least one axial groove that mounts the at least one guide track.

9. The quick coupling fitting according to claim 1, wherein the at least one guide track is one piece with the external casing of said first connector.

* * * * *